Aug. 16, 1966  P. DE HERTEL EASTCOTT  3,267,228
RATE OF ANGULAR ACCELERATION DEVICE
Filed Sept. 18 1964  3 Sheets-Sheet 1

INVENTOR.
PETER deH. EASTCOTT
BY
J T Comfort

United States Patent Office
3,267,228
Patented August 16, 1966

3,267,228
RATE OF ANGULAR ACCELERATION DEVICE
Peter de Hertel Eastcott, Peterborough, Ontario, Canada, assignor to Canadian General Electric Company, Limited, Toronto, Ontario, Canada, a corporation of Canada
Filed Sept. 18, 1964, Ser. No. 397,504
4 Claims. (Cl. 200—61.46)

My invention relates to a device for sensing the rate of acceleration of a rotating member, and in particular to a device for operating electrical contacts when the rate of angular acceleration of the member reaches a preset value.

There are certain electric motor driven machines where the starting of the motor requires special control in view of the nature of the load, but once the machine attains full speed the motor continues to operate in the usual way. Two examples of such machines are conveyor belts and turbine type compressors.

Generally, a belt-type conveyor cannot be started in the same way as most electric motor driven loads because the belt constitutes a large, unwieldy mass resting along its length on a large number of rollers, all of which tends to resist starting.

Moreover, the belt is an extremely elastic member which tends to stretch before it begins to move; this stretching and subsequent incremental movement begins at the drive pulley and progresses therefrom along the taut side of the belt. If the belt is very long and the drive pulley is accelerated too rapidly, it is possible for the driven end of the belt to be moving at a substantial rate of speed, or even at full speed, before the other end of the belt begins to move, in which case the belt accumulates a large amount of energy from being stretched abnormally. Once the last of the static friction of the system has been overcome, the stretched belt will tend to snap back to the length it would normally be for the particular operating conditions, and in so doing, it will release suddenly its stored energy to rapidly accelerate the retarded portions of the conveyor system. This sudden contraction of the belt can cause it to oscillate very severely and thereby damage the belt as well as other components of the conveyor system. If the belt is loaded with material such as crushed rock, chunks of rock may be thrown from the belt and strike personnel or other equipment in the vicinity of the conveyor system. Moreover overstretching the belt may weaken or even break it and thereby damage other components of the conveyor system as well. Therefore, elaborate means are often provided to obtain safe starting of a conveyor belt drive.

One well known drive for a belt type conveyor system uses either a fluid or an electromagnetic coupling to control starting of the system. In this particular system an alternating current induction motor drives the input element of the coupling, and the output element of the coupling drives the conveyor. Hence the motor can be brought up to full speed where it can develop full load torque before it is required to start the load. Fluid and electromagnetic couplings having the characteristics necessary for starting belted conveyors are readily available, as are the means for controlling such couplings to obtain proper starting of the conveyor.

In one prior art system, the drive is accelerated gradually up to a slow speed which is a fraction of full speed, and it is held at this slow speed for a definite period of time sufficient to allow the whole belt to attain this slow speed. After the whole belt operates at the slow speed, the drive is accelerated again to gradually bring operation of the conveyor belt up to full speed at a controlled rate of acceleration. The foregoing prior art system has proven to be satisfactory, but I considered it to be more elaborate and consequently more expensive than warranted for many conveyor belt applications, chiefly because fluid and electromagnetic couplings are relatively expensive items.

I have found that a fluid or an electromagnetic coupling can be dispensed with in the drive, and an induction motor coupled directly to drive a belted conveyor, or other apparatus requiring similar control of starting, when the novel control system described and claimed in a copending United States application, Serial Number 397,576, filed September 18, 1964, Eastcott et al., is employed. The rate of acceleration device forming the subject matter for this application has been found to be well suited for use as a key control element in the Eastcott et al. control system.

In a preferred form, my rate of acceleration device comprises a flywheel supported for rotation on very low friction bearings, and a driven member also supported for rotation. The member is coupled to drive the flywheel through yieldable means, such as a spring, the arrangement being such that this means is stressed by acceleration of the member. So long as the rate of acceleration of the member is within preset limits, the flywheel follows the member in synchronism therewith, but when the rate of acceleration of the member exceeds this preset rate, the flywheel falls out of step with the member and lags behind it. This relative angular displacement between the member and the flywheel is employed to initiate a control function, such as actuating electrical contacts. Hence the device has been found to be useful in the controls of an electrical motor drive to limit the rate at which the drive accelerates.

Two embodiments of my rate of acceleration device will now be described with reference to the following drawings in which.

Figure 1:
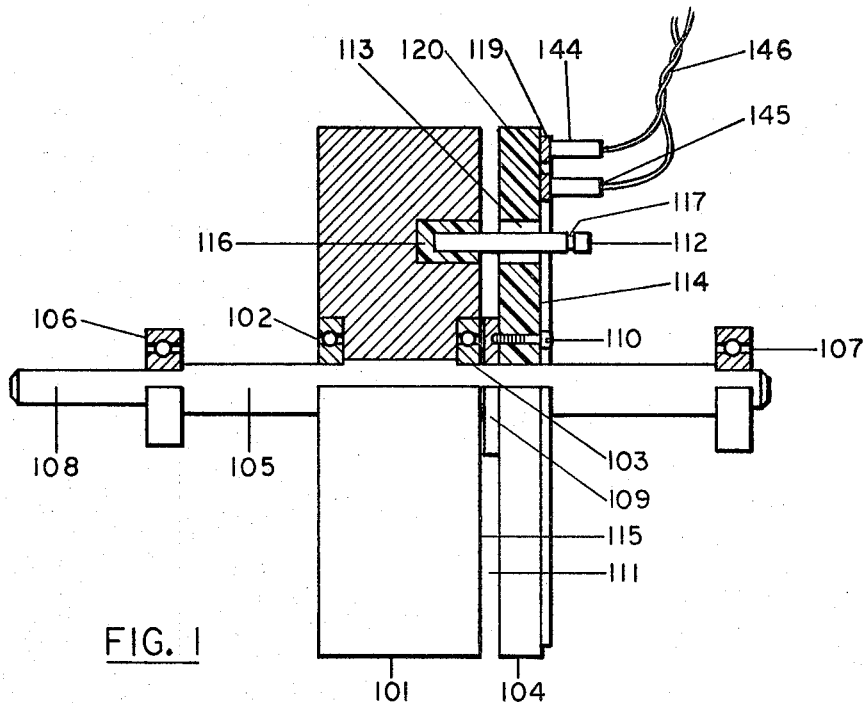
FIGURE 1 is a view in elevation and quarter section of the essential elements of a preferred embodiment of the invention.

In FIGURE 1 there is shown a flywheel 1 supported for rotation on ball bearings 2 and 3, which bearings should be of a type that offer very low friction to rotation of the flywheel. One race of each bearing is mounted on the flywheel and the other race is mounted on a suitable support. Preferably, the support for the flywheel is also the support for a discoidal driven member 104, which support is a shaft 105 mounted for rotation in bearings 106 and 107. Bearings 106 and 107 are mounted in a suitable frame (not shown) such as, for example, the enclosure normally used for a fractional horsepower motor, which enclosure has been adapted to support and enclose the rate of acceleration device. The end 108 of shaft 105 can be adapted to be coupled mechanically to the apparatus of which the acceleration is to be controlled. In the FIGURE 1 construction, shaft 105 rotates in bearings 106 and 107, flywheel 101 rotates about shaft 105 in bearings 102 and 103 and discoidal member 104 rotates with shaft 105 because it is secured thereto by means of collar 109. Collar 109 is a press fit on the shaft and is located adjacent to bearing 103. Member 104 is secured to the collar by means of a number of screws 110 which pass through the mid portion of the member into threaded holes in the collar. Member 104 has a central aperture 131 through which shaft 105 passes and it is spaced axially a short distance 111 from flywheel 101. The flywheel and member have substantially the same diameter and rotate in parallel planes.

Figure 2:
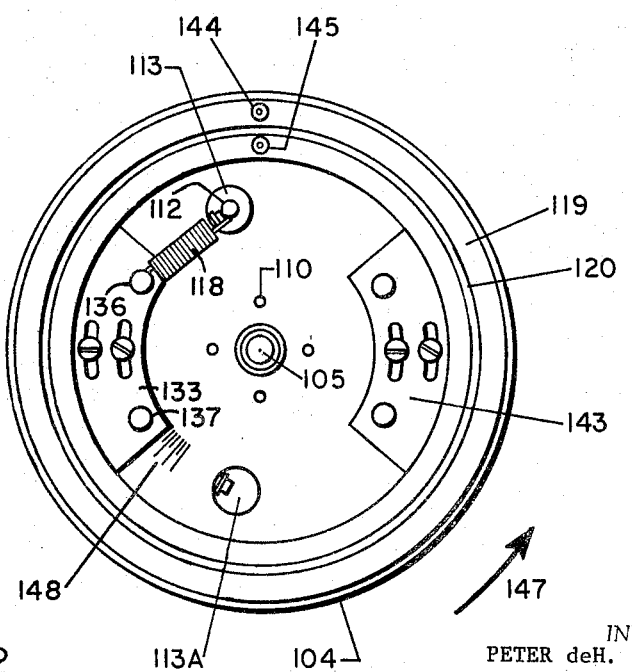
FIGURE 2 is a view in elevation of the right hand end of the device shown in FIGURE 1.
Figure 3:
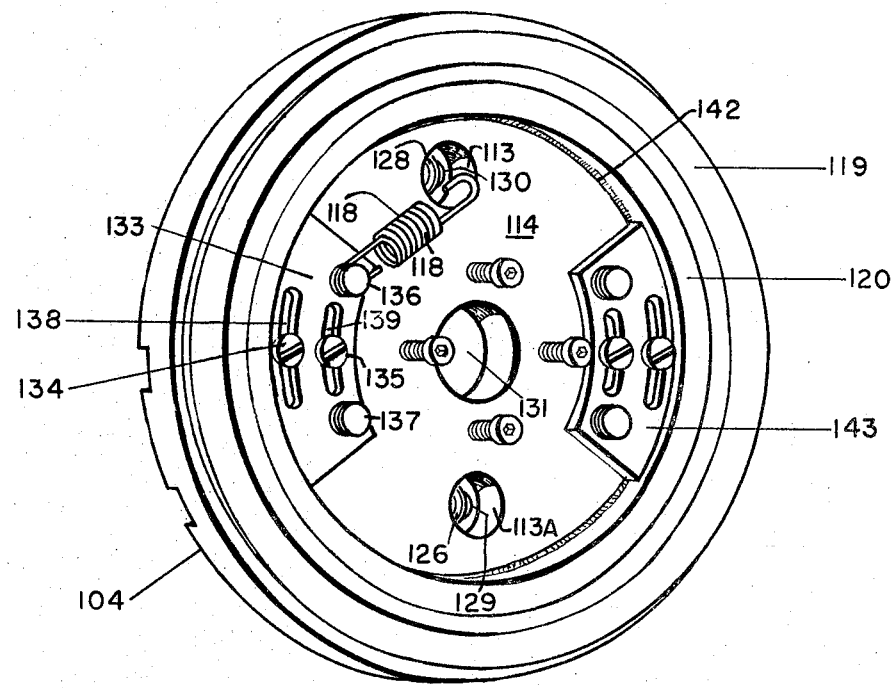
FIGURE 3 is a perspective view of the front of the driven member.

A metal pin 112 projects axially from the right hand end face 115 of the flywheel through an aperture 113 in member 104, and extends a short distance beyond the front face 114 of the member. The pin is secured in a plug 116 of insulating material, which plug in turn is anchored in a hole in the flywheel, whereby the pin is supported on and insulated from the flywheel. An annular groove 117 is formed in that portion of the free end of the pin which projects beyond the member for receiving one looped end of a coiled tension spring 118 (FIGURES 2 and 3).

Figure 4:
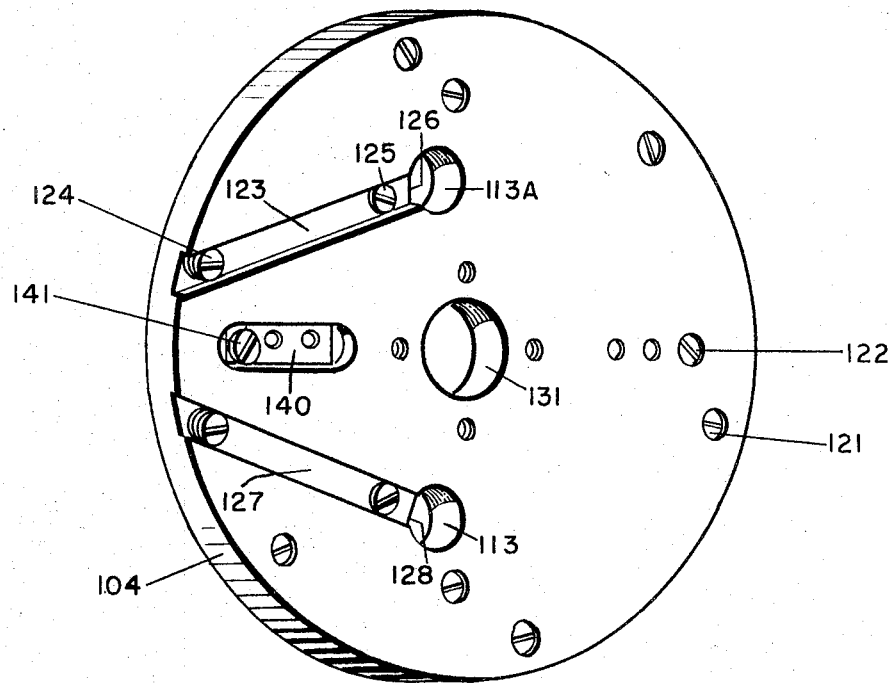
FIGURE 4 is a perspective view of the back of the driven member.

Preferably, member 104 is a disc made of insulating material and formed with a number of apertures, such as, a central aperture 131 for the shaft, diametrically opposite apertures 113 and 113A for pin 112, and a number of holes for screws which secure various components to the member. Electrically conductive slip rings 119 and 120 are secured to the front face 114 of the discoidal member by means of screws 121 and 122, the slip rings being positioned on the disc in concentric radially spaced relationship. A conductive strap 123 has its outer end secured to slip ring 119 by means of a screw 124, and has its inner end formed with a right angular portion 126 which projects through aperture 113A and rests along the wall of the aperture. A second screw 125 cooperates with screw 124 to secure the strap to the member. Another similar strap 127 has its outer end secured to slip ring 119 and its inner end formed with a right angular portion 128 resting in aperture 113. Portion 126 of strap 123 carries contact 129 which projects towards the central axis of aperture 13A, and portion 128 of strap 127 carries a similar contact 130 which projects towards the central axis of aperture 113. It is to be noted in connection with drawing FIGURES 2 to 4 that the slip rings are positioned adjacent the periphery of the discoidal member coaxial therewith, and that apertures 113 and 113A are located intermediate slip ring 120 and the central aperture 131 in the disc. This is considered to be the most convenient arrangement of the slip rings with respect to other components. Apertures 113 and 113A are spaced equally from aperture 131 on opposite sides thereof to ensure dynamic balance.

A conductive bracket 133 is secured to member 104 by means of screws 134 and 135 which pass through holes in the member and are threaded into strap 140. The outer end of strap 140 is secured to slip ring 120 by means of screw 141. Screws 134 and 135 are located intermediate slip ring 120 and aperture 131 substantially equidistant from apertures 113 and 113A. An annular recess 142 is formed in the front face of the discoidal member inwardly of slip ring 120, and a flange on the outer curved edge of the bracket projects into this recess for positioning the bracket a fixed distance from aperture 131. The bracket contains a pair of curved slots 138 and 139 for screws 134 and 135 respectively, thus making it possible to move the bracket a limited distance along the path defined by recess 142, and securing it in any one of these positions. The opposite inner ends of the bracket have short studs 136 and 137 projecting therefrom away from the member. Each stud is formed with an annular groove adapted to receive a hooked end of coil spring 118, of which the other end is hooked onto pin 112 in groove 117. An identical bracket 143 is secured to the member diametrically opposite from bracket 133, and serves as a counter balance therefor. It is to be noted that grooves are cut in member 104 for straps 123, 127 and 140 in order to maintain the balance of the member. Bracket 133 is made adjustable so that the prestressing of spring 118 is adjustable.

Slip ring 119 is connected electrically to contacts 129 and 130 via straps 123 and 127 respectively, and slip ring 120 is connected electrically to bracket 133 through strap 140. The slip rings can be connected to an external circuit by means of conductive brushes 144 and 145 which are supported in suitable holders (not shown) fastened to the frame of the device. One end of brush 144 bears against slip ring 119, and one end of brush 145 bears against slip ring 120 while leads 146 from the brushes provide a means for connecting the device in an electrical circuit.

The operation of the rate of acceleration device will now be described. As stated previously, end 108 of shaft 105 is coupled mechanically to the load of which the acceleration is to be controlled. Hence shaft 105 and member 104 are driven by the load and the member in turn drives the flywheel through the medium of spring 118. It can be seen from FIGURE 2 that rotation of member 104 counter-clockwise as denoted by arrow 147 causes the flywheel to rotate counter-clockwise also. When the member begins to rotate from rest, acceleration of the member stresses spring 118 further and in so doing the energy imparted to the spring pulls counter-clockwise on pin 112, thereby causing the flywheel to follow the member. So long as the rate at which member 104 accelerates is below a preset value the flywheel will follow it without becoming displaced angularly with respect to it. Hence, if the rate of acceleration of the member is below the preset value, the flywheel will accelerate at this same rate. This condition will hold from standstill to full speed. This preset value is determined by the amount that the spring is prestressed while the device is at rest. If the rate of acceleration of the member exceeds this preset value, the spring can no longer maintain the flywheel in step or synchronism with the member, and consequently the flywheel falls behind the member, i.e., becomes displaced with respect thereto. However, the amount of this displacement is very limited because pin 112 is stopped by the wall of aperture 113, and during any further increase in the rate of acceleration of the member the member acts directly on the pin. Hence the spring will not become overstressed.

The setting of the device for the desired rate of acceleration is done by adjusting the position of bracket 133, i.e., loosening screws 134 and 135 and moving the bracket. Once the characteristics of a spring 118, are known, the bracket can be set to a scale such as 148, this scale being correlated with the acceleration characteristics of the device.

It will be noted with reference to FIGURE 2 that normally spring 118 biases pin 112 against contact 130, thereby completing a circuit from brush 144 to brush 145 by way of slip ring 119, strap 127, contact 130, pin 112, spring 118, bracket 133, strap 140, and slip ring 120. When member 104 accelerates at a rate in excess of the preset rate, pin 118 separates from contact 130 to break the circuit.

In FIGURE 2, pin 112 rests in aperture 113 and spring 118 is tensioned between stud 136 and pin 112 for counter-clockwise rotation. To reverse the direction of rotation of the device, pin 112 is inserted into aperture 113A instead of 113 and the spring is tensioned between stud 137 and pin 112. Of course, the position of bracket 133 must now be altered for the proper setting. Bracket 143 is also adjustable so that it can be placed opposite bracket 133 where it will maintain proper balance of the member.

Figure 5:
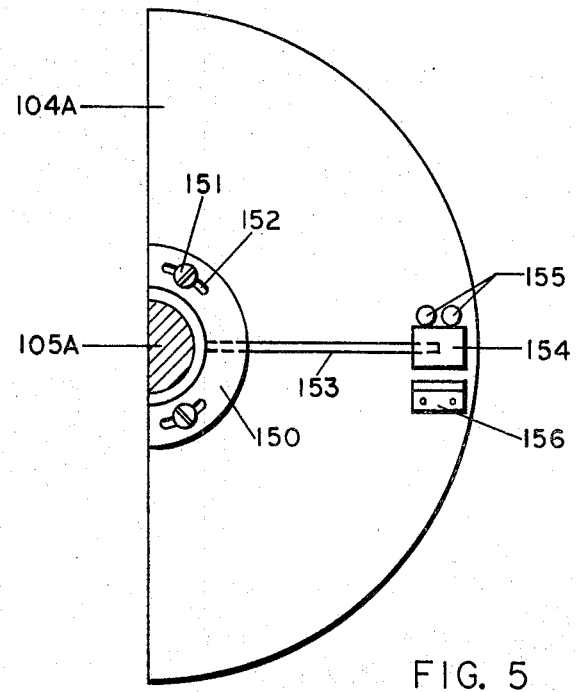
FIGURE 5 is a view in elevation of another embodiment of the invention.

FIGURE 5 illustrates another form the invention may take in which the flywheel has been replaced by another type of inertial member. In this construction the driven member is a disc 104A secured to shaft 105A, for rotation therewith. An annular collar 150 is secured to disc 104A centrally thereof by means of a number of screws 151 which pass through slotted holes 152 in the collar into threaded holes in the disc, holes 152 being slotted to allow for limited angular adjustment of the collar with respect to the disc. An arm 153 projects radially outward from the collar in spaced relation to the face of the disc with its broad surfaces perpendicular to the face, and has a weight 154 on its free end adapted to actuate a set of electrical contacts, such as bridging a pair of contacts 155 or actuating a micro switch. The arm and weight are free to swing without interference from the disc, and the arm is spring biased in the direction of rotation of the disc, either to contacts closed, or to contacts open against a stop 156 secured to the disc, the position depending upon the particular application of the acceleration device in a control system.

The arm may be a leaf spring having its inner end fixed to the collar as shown in FIGURE 5, or the arm may be a rigid member pivotally supported on the collar on an axis parallel to shaft 105 and biased in the desired direction by means of a coil spring stretched between the arm and the disc. During operation of the FIGURE 5 construction the weight on the free end of the arm behaves in much the same way as does the flywheel in the FIGURES 1 to 4 construction except that the mass of the weight is relatively small compared with the mass of the flywheel, and as a result the contact forces will be much smaller in the latter embodiment of the invention. However, the FIGURE 5 construction is a relatively simple device, and in its simplest form disc 104A is made of an insulating material having contacts 155 mounted directly thereon and connected electrically to slip rings 119 and 120 on the other face of the disc. Obviously, for many applications it will be necessary to provide a counterweight on the disc diametrically opposite weight 154. Setting the operating point of the device is accomplished by loosening screws 151, moving collar 150 a position providing the proper spring tension and then retightening the screws.

The embodiments of the invention in which an exclusive property or privilege is claimed are defined as follows:

1. A rate of angular acceleration device comprising a shaft supported for rotation about its axis; a flywheel supported on said shaft by low friction bearings for rotation about said axis independently of said shaft, a disc-shaped member of insulating material secured to said shaft adjacent said flywheel for rotation with said shaft; said member having its central axis substantially coincident with the axis of the shaft and having one face spaced a relatively short distance from one end of said flywheel; a pin secured to and insulated from said flywheel; an aperture through said member transversely thereof; an electrical contact disposed in said aperture at the wall thereof and secured to said member, said pin projecting axially from said one end of the flywheel through said aperture and terminating beyond the other face of the member, said aperture being large enough to contain said contact and yet allow for limited relative rotary displacement between said member and said flywheel, a conductive bracket secured to said member on the other face thereof; a coil spring secured at one end thereof to the terminus of said pin and at its other end to said bracket, said spring biasing said pin against the wall of said aperture; a pair of slip rings secured to said member on the other face thereof; a conductor connecting one slip ring to said contact; another conductor connecting the other slip ring to said bracket; and current collectors for completing an electrical circuit to said slip rings.

2. The device defined in claim 1 wherein said spring biases said pin towards said contact.

3. The device defined in claim 1 wherein the position of said bracket can be altered to adjust the tension on said spring and thereby the calibration of said device.

4. The device defined in claim 2 wherein the position of said bracket can be altered to adjust the tension on said spring and thereby the calibration of said device.

References Cited by the Examiner

UNITED STATES PATENTS

| | | | |
|---|---|---|---|
| 2,162,490 | 6/1939 | Mikina | 200—61.46 |
| 2,290,588 | 7/1942 | Grondahl | 200—61.46 |
| 2,412,513 | 12/1946 | Jones et al. | 200—61.46 |

FOREIGN PATENTS 672,785  9/1929  France.

BERNARD A. GILHEANY, *Primary Examiner.*

J. J. BAKER, *Assistant Examiner.*